June 24, 1952　　　A. J. F. SIEGERT　　　2,601,334
PROCESS FOR DETECTING GAMMA RAYS
Original Filed June 22, 1945
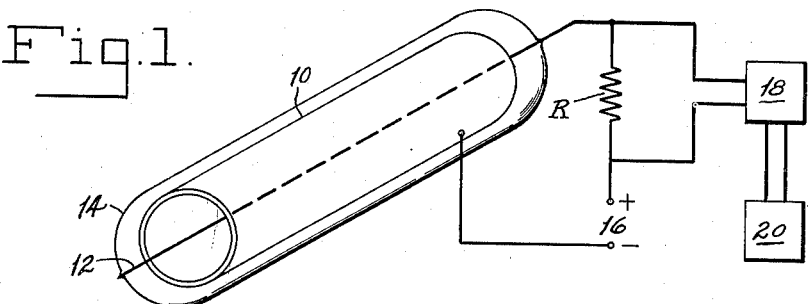
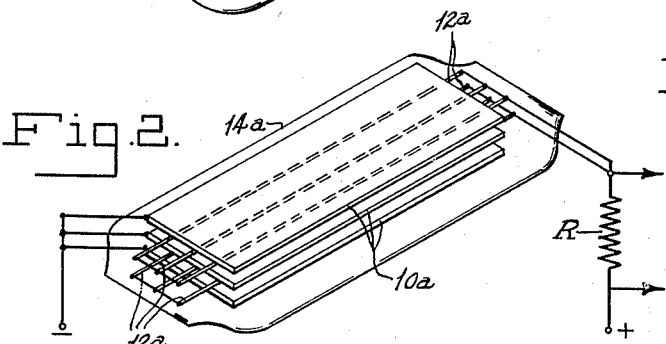
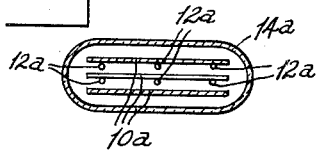
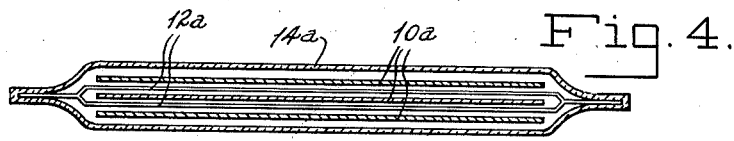
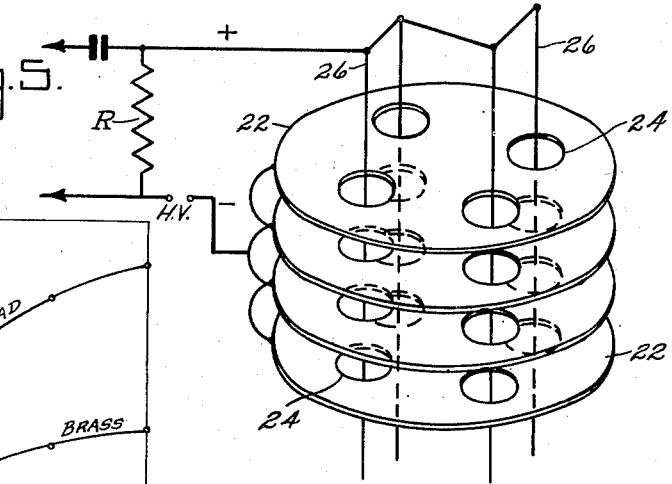
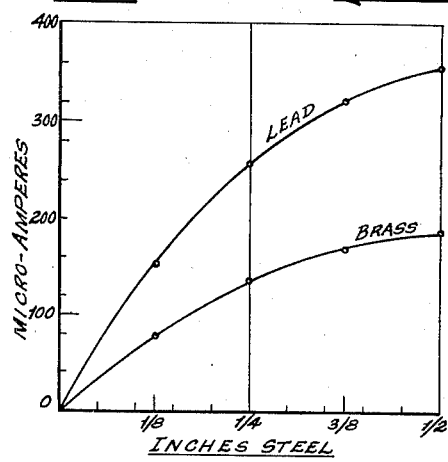
INVENTOR.
ARNOLD J. F. SIEGERT
BY
ATTORNEYS Patented June 24, 1952

2,601,334

UNITED STATES PATENT OFFICE 2,601,334

PROCESS FOR DETECTING GAMMA RAYS

Arnold J. F. Siegert, Evanston, Ill., assignor to The Texas Company, New York, N. Y., a corporation of Delaware Original application June 22, 1945, Serial No. 600,865. Divided and this application March 5, 1949, Serial No. 79,773

5 Claims. (Cl. 250—83.6)

This invention relates to the measurement of penetrative radiation and more particularly to the measurement of relatively low energy radiation such as scattered gamma rays. The principal object of the invention is the provision of a device for detecting radiation of comparatively low energy such as gamma rays originating in a source and scattered within a medium or media back to the detector, which detecting device has a higher efficiency than those commonly in use.

This is a division of my copending application Serial No. 600,865, filed June 22, 1945, now abandoned.

In the U. S. Letters Patents of D. G. C. Hare, Nos. 2,277,756, 2,348,810, 2,304,910, and in the copending application of Herzog et al., Serial No. 574,870, filed January 27, 1945, now Patent No. 2,536,131, instruments are disclosed for making various measurements such as the thickness of a plate or tube wall, the level of a liquid in a container and the density of a fluid in a container or pipe entirely from one side of the object or container. In each case gamma rays from a source are caused to penetrate an object or medium and a portion of the rays scattered in and returned outwardly of the object or medium are measured, this measurement providing an indication of the characteristic desired. In order to obtain useful and accurate measurements it is, of course, desirable that the instrument used for measuring the scattered rays have as high an efficiency as possible. In instruments of this type some primary or direct rays, i. e., those emitted directly from the source also strike the detector thus causing false readings to be obtained. It is often difficult to minimize the direct rays to the desired extent without providing large masses of shielding material between the source and the detector, and naturally the larger the shield the farther the detector must be spaced from the source. It is, therefore, very desirable to provide a detector which will have a greater proportional response to the scattered rays which it is desired to measure than to the direct rays which it is desired to minimize.

In accordance with the invention it has been found that metals of high atomic number such as lead, tungsten and the like, when used as the cathode of the gamma ray detector show a much higher efficiency than metals of lower atomic number such as brass and copper when the gamma rays to be measured have an energy of 0.5 megavolt or less, this being due to the photoeffect. Although cathodes of the higher atomic number metals are also more efficient than the metals of lower atomic number when measuring direct gamma radiation, the increase in efficiency of the higher atomic number metals is proportionately much greater when measuring low energy gamma rays such as those which have been scattered in an object or medium than when measuring higher energy rays such as the direct or primary rays passing directly from the source to the detector. This has been proven experimentally and tests made with detectors having brass cathodes and detectors having lead cathodes have shown that while in measuring direct radiation there is an increase in efficiency due to the lead of say 20 to 30%, the increase in efficiency of the lead in measuring scattered gamma rays is frequently from one hundred to several hundred per cent.

The advantages obtainable due to this increased efficiency in measuring characteristics which require the detecting of scattered radiation will be apparent. Thus, in an instrument such as is disclosed in the aforementioned Hare Patent No. 2,277,756 and in the copending Herzog et al. application, Serial No. 574,870, greater thicknesses of an object can be accurately measured with the same amount of radioactive source or the same thicknesses can be measured with a smaller source. Likewise, with a certain amount of radioactive source a thickness measuring instrument in which the detector cathode is formed of lead, for instance, can be moved more rapidly over a surface of the wall being measured than an instrument with the same size source but having a detector cathode of copper or brass and consequently more measurements can be made in a specified time. Again, in certain methods of logging the formations surrounding a well or bore hole, gamma rays from a source in the hole are caused to penetrate the surrounding formations wherein some of the rays are scattered back to a detector in the vicinity of the source. When using a detector more efficient in measuring scattered gamma rays than in measuring direct gamma rays the instrument can be passed more rapidly through the hole with an attendant saving of time.

In the following, several different forms of gamma ray detectors will be described, each of these detectors being provided with a cathode of a metal having a high atomic number, preferably between 73 and 83. Because of the comparative cheapness of lead, this metal will be referred to generally but it is to be understood that other metals such, for instance, as tungsten and gold, will also be very satisfactory, as will any of the 2,601,334 metals in the following list of elements having atomic numbers between 73 and 83:

| | | | |
|---|---|---|---|
| Tantalum | 73 | Platinum | 78 |
| Tungsten | 74 | Gold | 79 |
| Rhenium | 75 | Thallium | 81 |
| Osmium | 76 | Lead | 82 |
| Iridium | 77 | Bismuth | 83 |

For a better understanding of the invention reference may be had to the accompanying drawing in which:

Figure 1 is a somewhat diagrammatic representation of a gamma ray detector or counter of a more or less conventional type;

Figure 2 is a similar representation of another embodiment of the invention;

Figures 3 and 4 are respectively transverse and longitudinal sections through the device of Figure 2;

Figure 5 is a diagrammatic representation of another form of detector in which the anode is disposed at right angles to a bank of cathode plates, and Figure 6 is a curve showing the outputs of two detectors used in measuring the thickness of steel plates, one of the detectors having a lead cathode and the other having a brass cathode.

In Figure 1 is shown a radiation detector or counter of a conventional type, this device consisting of a thin walled metal tube 10 with a thin wire comprising the anode 12 disposed on the longitudinal axis of the tube 10 which forms the cathode. These electrodes are shown as enclosed in a suitable sealed envelope or casing 14 which may be a glass tube or a metal container and which contains a suitable gas such as a mixture of argon and petroleum ether at a fairly low pressure of, for instance, 20 cm. of Hg. A central wire or anode 12 is preferably maintained at a positive potential with respect to the cathode 10 and a fairly high resistance R is connected in series with a source 16 of a potential generally around 900 to 1000 volts. A gamma ray striking the cathode 10 may eject an electron therefrom which in turn may ionize the gas causing a discharge to take place with a current flow of the order of a few microamperes. This causes a large voltage drop across the resistance R and by suitably amplifying this voltage drop by means of an amplifier 18, a mechanical recorder 20 or other device capable of registering the discharges of the counter may be actuated. The cathode cylinder 10 is formed of a thin sheet of about .016 inch in thickness of a metal having an atomic number between 73 and 83 since because of the high atomic weight and high density of these metals there is a much greater likelihood of electrons being ejected by gamma rays of low energy than in the case of metals such as brass and copper.

In Figures 2, 3 and 4, a somewhat different form of detector or counter is illustrated in which the cathode is formed of a bank of thin lead sheets or plates 10a spaced uniformly apart. Midway between each adjacent pair of cathode plates a plurality, three in this instance, of fine wires are stretched so as to be parallel to each other and to the plates. The electrodes are mounted within a suitable casing or envelope 14a as was described with reference to Figure 1 and the plates are connected together electrically to form the cathode of the device. The wires 12a may all be connected together to form a single anode or the wires may be connected in separate groups to form a number of electrically separated anodes. The wires 12a being disposed in this manner provide the desired concentration of the electrical field and it is to be understood that while only three cathode plates and two sets of anode wires are illustrated, any greater number may be used, this number being limited only by the size of the surrounding casing or envelope.

In Figure 5 still another form of detector or counter is illustrated, this device comprising a plurality of thin, circular, lead sheets or plates 22, these plates being disposed in separated parallel relation and connected together electrically to form a cathode. Each plate 22 is provided with a plurality of holes 24 shown in this instance as four in number, and the holes in the bank of plates are arranged in alignment in several groups or series. Through each series of holes 24 a fine wire 26 is stretched on the axis of the series of holes and the wires are shown as connected together electrically to form the anode of the device. In this instance and for the sake of clearness, no casing has been shown, but it is to be understood that as many of the plates 22 as desired will be arranged in an elongated, preferably cylindrical casing of brass or other suitable material, the casing being filled with a suitable gas as described with reference to Figure 1.

Several detectors or counters of the type shown in Figure 5 have been constructed and found very satisfactory. As a typical example, one of these counters contains a stack or bank of cathode sheets or plates which are spaced from each other a distance of $\frac{3}{16}$ of an inch. Each plate contains four holes ½ inch in diameter and through each of the holes a tungsten anode wire of 3 mil diameter is disposed. Twelve lead cathode plates, each of .016 inch thickness and 2 inches in diameter, are mounted in a cylindrical brass casing four inches in length. Counters of this type have been used effectively in the instruments described in the aforementioned patents and copending patent application.

In Figure 6 is shown a curve or rather a pair of curves which were made on two of the counters as described in the above paragraph, one of the counters having a lead cathode and the other a brass cathode, both of these counters being used to measure scattered gamma rays, i. e., rays having an energy of 0.5 megavolts or less. These curves were obtained under exactly the same geometrical conditions and with the same amount of radium. It will be noted that the response of the lead cathode counter was substantially twice as great as the response of the brass cathode counter.

It has been found advisable to clean the surfaces of the lead sheets or plates before use and the following method has proven very satisfactory. The lead plates are first dipped for several minutes in aqua regia and they are then immersed for approximately one minute in a boiling concentrated solution of sodium hydroxide. The plates are then rinsed with water, alcohol and ether and dried in the open air. After the assembly of the counter, it is filled with a mixture of substantially 97% argon and 3% petroleum ether, the filling process consisting in evacuating the counter with a rotary pump for about three hours without heating the counter. During this process the counter is flushed several times with argon. The filling pressure of the final gas is the same as for brass cathode counters, about 20 inches absolute pressure. Tungsten is also an effective metal for these counters when measuring low energy gamma rays and since tungsten is chemically inactive, it is therefore easy to maintain a clean metallic surface. A commercially obtainable material called "Mallory 1000" contains over 99% pure tungsten and can readily be formed into thin sheets of the desired shape and size.

Obviously many modifications and variations of the invention, as hereinbefore set forth, may be made without departing from the spirit and scope thereof and, therefore, only such limitations should be imposed as are indicated in the appended claims.

I claim:

1. In a process involving detection of gamma rays in a detector having an anode and a cathode with an ionizable medium disposed between them, the improvement which comprises introducing at least some of the gamma rays having an energy above a level of about 0.5 megavolts into a second medium in which at least some of the introduced gamma rays are partially deenergized below said energy level, introducing at least some of the gamma rays thus deenergized and some of the gamma rays having an energy above the 0.5 megavolt level into the detector, and providing the cathode thereof with a metal of a high atomic number which imparts to the detector as compared with one provided with a metal cathode of low atomic number an increase in detection efficiency which is proportionally greater for gamma rays below about the 0.5 megavolt level than for gamma rays above said level, whereby the detection of the gamma rays below about the 0.5 megavolt level is emphasized while the detection of the gamma rays above the 0.5 megavolt level is deemphasized.

2. In a process involving detection of gamma rays in a detector having an anode and a cathode with an ionizable medium disposed between them, the improvement which comprises introducing a beam of gamma rays at least some of which have an energy above the 0.5 megavolt level into a second medium in which at least part of the gamma rays are back-scattered and are deenergized below said level, introducing the back-scattered gamma rays of the energy level below 0.5 megavolts together with gamma rays which have not been back-scattered and have an energy level above 0.5 megavolts into the detector, providing the cathode thereof with a high atomic number metal which imparts to the detector, as compared with one provided with a metal cathode of low atomic number, an increase in detection efficiency which is proportionally greater for gamma rays below about the 0.5 megavolt level than for gamma rays above said level, whereby the back-scattered gamma rays are detected with higher efficiency while discriminating against the detection of the gamma rays of higher energy.

3. Process according to claim 2 in which the cathode is of tantalum.

4. Process according to claim 2 in which the cathode is of lead.

5. Process according to claim 2 in which the cathode is of bismuth.

ARNOLD J. F. SIEGERT.

REFERENCES CITED

The following references are of record in the file of this patent:

UNITED STATES PATENTS

| Number | Name | Date |
| --- | --- | --- |
| 2,397,071 | Hare | Mar. 19, 1946 |

OTHER REFERENCES

Brown Nucleonics, Aug. 1948, pgs. 50, 51 and 64.

Evans and Mugele, Review of Scientific Instruments, vol. 7, Dec. 1936, pgs. 441–449.

Compton X-rays and Electrons, D. Van Nostrand Co., 8 Warren St., New York, 1926, pgs. 184–185.